United States Patent
Kuo et al.

(10) Patent No.: US 8,570,953 B2
(45) Date of Patent: *Oct. 29, 2013

(54) METHOD FOR IMPROVING HIGH-SPEED DOWNLINK OPERATION IN CELL_FACH STATE FOR A WIRELESS COMMUNICATIONS SYSTEM AND RELATED APPARATUS

(75) Inventors: Richard Lee-Chee Kuo, Taipei (TW); Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 1662 days.

This patent is subject to a terminal disclaimer.

(21) Appl. No.: 12/029,388

(22) Filed: Feb. 11, 2008

(65) Prior Publication Data

US 2008/0192688 A1   Aug. 14, 2008

Related U.S. Application Data

(60) Provisional application No. 60/889,302, filed on Feb. 12, 2007.

(51) Int. Cl.
*H04W 4/00* (2009.01)
*H04W 72/00* (2009.01)

(52) U.S. Cl.
USPC .......................................... 370/329; 455/450

(58) Field of Classification Search
USPC ....................................................... 370/329
See application file for complete search history.

(56) References Cited

U.S. PATENT DOCUMENTS

| | | | |
|---|---|---|---|
| 7,894,390 B2 * | 2/2011 | Nakamata et al. | 370/329 |
| 2005/0266846 A1 | 12/2005 | Kim | |
| 2006/0183429 A1 | 8/2006 | Anderson | |
| 2006/0199591 A1 | 9/2006 | Klatt | |
| 2006/0240766 A1 * | 10/2006 | Wilde | 455/3.01 |
| 2007/0155390 A1 * | 7/2007 | Kodikara Patabandi et al. | 455/450 |
| 2007/0189236 A1 * | 8/2007 | Ranta-aho et al. | 370/335 |

(Continued)

FOREIGN PATENT DOCUMENTS

| | | |
|---|---|---|
| CN | 1833452 A | 9/2006 |
| EP | 1418717 A1 | 5/2004 |

(Continued)

OTHER PUBLICATIONS

Siemens, "System Information Change handling in enhanced CELL_FACH" Jan. 16, 2007, 3GPP TSG RAN2#57, pp. 1-2.*

(Continued)

*Primary Examiner* — Guang Li (74) *Attorney, Agent, or Firm* — Blue Capital Law Firm, P.C.

(57) ABSTRACT

A method of improving a high-speed downlink operation in CELL_FACH state for a network terminal of a wireless communications system includes using a first function but not using a second function when a user equipment, hereinafter called UE, initiates a radio resource control establishment procedure. The network terminal wirelessly communicates with the UE, and the network terminal and the UE both support the high-speed downlink operation in CELL_FACH state. The first function is used for allocating a dedicated HS-DSCH radio network transaction identifier (H-RNTI) to the UE, so as to manage the UE to perform the high-speed downlink operation in CELL_FACH based on the dedicated H-RNTI. The second function is used for not allocating the dedicated H-RNTI to the UE.

12 Claims, 4 Drawing Sheets

(56) References Cited

U.S. PATENT DOCUMENTS

| | | | |
|---|---|---|---|
| 2007/0258402 A1* | 11/2007 | Nakamata et al. | 370/329 |
| 2008/0089285 A1* | 4/2008 | Pirskanen et al. | 370/329 |
| 2008/0182594 A1* | 7/2008 | Flore et al. | 455/458 |
| 2008/0188220 A1* | 8/2008 | DiGirolamo et al. | 455/434 |
| 2008/0311923 A1* | 12/2008 | Petrovic et al. | 455/450 |

FOREIGN PATENT DOCUMENTS

| | | |
|---|---|---|
| EP | 1519595 A1 | 3/2005 |
| EP | 1 631 016 A1 | 3/2006 |
| EP | 1699253 A2 | 9/2006 |
| JP | 2002218531 A | 8/2002 |
| JP | 2007531350 A | 11/2007 |
| KR | 1020050082658 A | 8/2005 |
| KR | 1020060123542 A | 12/2006 |
| WO | 2005006829 A2 | 1/2005 |
| WO | 2008084955 A1 | 7/2008 |

OTHER PUBLICATIONS

Notice of Allowance on corresponding foreign application (JP Application No. 2008-029135) from the JPO dated Nov. 24, 2010.

LG Electronics: "MAC PDU Structure for HS-DSCH in CELL_FACH", 3GPP TSG-RAN WG2 #57, R2-070529, Feb. 15-19, 2007, St. Louis, USA.

LG Electronics: "Discussion on HS-FACH Operation", 3GPP TSG-RAN WG2 #56bis, R2-070284, Nov. 15-Jan. 19, 2007, Sorrento, Italy.

R2-070405 3GPP TSG-RAN WG2 Meeting #56bis, "Stage 2 updates for Enhanced CELL_FACH state in FDD".

R2-070508 3GPP TSG-RAN WG2 Meeting #57, "Introduction of Enhanced CELL_FACH state (to RRC)".

R2-070507 3GPP TSG-RAN WG2 Meeting #57, "Introduction of HS-DSCH reception in CELL_FACH state".

3GPP TS 25.331 V7.3.0 (Dec. 2006) Radio Resource Control (RRC); Protocol Specification (Release 7).

3GPP TS 25.321 V7.3.0 (Dec. 2006) Medium Access Control (MAC); Protocol Specification (Release 7).

3GPP TS 25.308 V7.5.0(Dec. 2007), Technical Specification, 3rd Generation Partnership Project; Technical Specification Group Radio Access Network; High Speed Downlink Packet Access (HSDPA); Overall description; Stage 2 (Release 7), p. 46-p. 49.

Office Action on corresponding foreign application (CN 200810074048.1) from the State Intellectual Property Office of the PRC dated Sep. 10, 2010.

* cited by examiner

METHOD FOR IMPROVING HIGH-SPEED DOWNLINK OPERATION IN CELL_FACH STATE FOR A WIRELESS COMMUNICATIONS SYSTEM AND RELATED APPARATUS

CROSS REFERENCE TO RELATED APPLICATIONS

This application claims the benefit of U.S. Provisional Application No. 60/889,302, filed on Feb. 12, 2007 and entitled "Method And Apparatus for improving HS-DSCH Reception in CELL_FACH State in a Wireless Communication System", the contents of which are incorporated herein by reference.

BACKGROUND OF THE INVENTION

1. Field of the Invention

The present invention relates to a method for improving a high-speed downlink operation for a wireless communications system and related communications device, and more particularly to a method for improving a radio resource control (RRC) establishment procedure used for a high-speed downlink operation in a CELL_FACH state for a wireless communications system and related communications device.

2. Description of the Prior Art

The third generation (3G) mobile telecommunications system has adopted a Wideband Code Division Multiple Access (WCDMA) wireless air interface access method for a cellular network. WCDMA provides high frequency-spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the 3rd Generation Partnership Project (3GPP) provides High Speed Package Access (HSPA) technology, which includes High Speed Downlink Package Access (HSDPA) and High Speed Uplink Package Access (HSUPA), to increase bandwidth utility rate and package data processing efficiency so as to improve uplink/downlink transmission rate.

On the basis of HSDPA, the 3GPP launches High Speed Downlink Shared Channel reception in CELL_FACH state, which is abbreviated to HS-DSCH reception in CELL_FACH state, and CELL_FACH state is well known as one of radio resource control (RRC) states. HS-DSCH reception in CELL_FACH state allows a user equipment (UE) monitoring the HS-DSCH for downlink data reception with cooperation of related control channel, namely Shared Control Channel for HS-DSCH (HS-SCCH), so as to improve peak data rate, signaling delay, state transition delay and flexible cell capacity.

A UMTS radio access network (UTRAN) enables HS-DSCH reception in CELL_FACH state by means of the system information broadcast, and related parameters correspond to HS-SCCH and HS-DSCH configuration and a common HS-DSCH radio network transaction identifier (Common H-RNTI).

The parameters corresponding to the common H-RNTI provides multiple common H-RNTIs values for the UE to select. For the UE in idle mode, the parameters are obtained from a "Downlink HS-PDSCH system information" information element (IE), included in a system information block (SIB) type 5/5bis. For the UE in the RRC connected mode, the parameters are obtained from a "Downlink HS-PDSCH system information for connected mode" IE, included in a SIB type 6. On the other hand, the UE includes a common H-RNTI variable for storing the selected common H-RNTI. Each common H-RNTI is shared by several UEs for grouping the UEs in the same cell, and also represents an identity of the UEs in the same group.

In addition to the common H-RNTIs, the UE may use a dedicated H-RNTI for HS-DSCH reception in CELL_FACH state. Each dedicated H-RNTI only represents the identity of a specific UE. Through an RRC establishment procedure initiated by the UE, the UTRAN can determines to use a first function or a second function for allocating a dedicated H-RNTI to the UE or not.

As well known in the art, RRC states of the UE contain an idle mode and a RRC connected mode including CELL_PCH, URA_PCH, CELL_FACH and CELL_DCH states. When the UE in the idle mode attempts to setup an RRC connection with the UTRAN, the UE has to initiate an RRC establishment procedure. The process of exchanging related RRC messages is described as follows. Firstly, the UE sends an RRC CONNECTION REQUEST message to the UTRAN. If the UTRAN accepts the request for connection establishment, the UTRAN sends an RRC CONNECTION SETUP message including a designated RRC state. Accordingly, the UE does the related configuration setting according to the RRC CONNECTION SETUP message, and then sends back with an RRC CONNECTION SETUP COMPLETE message to notify the UTRAN that the related configuration setting is done. If the RRC CONNECTION SETUP message includes invalid configuration or function settings not supported by the UE, the UE determines the RRC CONNECTION SETUP message is invalid and thereby re-initiates the procedure or continues staying in the idle mode. On the other hand, if the UTRAN rejects the request due to insufficient resources or a poor communications environment, an RRC CONNECTION REJECT message is sent to notify the UE.

If the UTRAN uses the first function, a New H-RNTI IE is set with a designated H-RNTI and then included in the RRC CONNECTION SETUP message. On the other hand, the UE owns an H-RNTI variable for storing the settings of the New H-RNTI IE. If the UTRAN uses the second function, no New H-RNTI IE is included in the RRC CONNECTION SETUP message, and the UE continues using the original common H-RNTI.

The UE can activate or deactivate the HS-DSCH reception in CELL_FACH state by determining a HS_DSCH_RECEPTION_CELL_FACH_STATE variable. When the UE enters CELL_FACH state and also activates HS-DSCH reception, the UE uses the dedicated H-RNTI if the H-RNTI variable is set. Otherwise, the common H-RNTI is used. Thus, if the UTRAN never determines to use the first function, the UE keeps using the common H-RNTI for HS-DSCH reception in CELL_FACH state.

For a transmission packet header, except for the headers mapped to HS-DSCH or enhanced dedicated channel (E-DCH), a media access control (MAC) layer defines five fields as follows: Target Channel Type Field (TCTF), C/T, UE Id, UE Id Type and MBMS Id. The UE Id and UE Id Type fields are both used for providing an identifier of the UE so that the UE can identify the packets belonging to it.

In the MAC layer of the UTRAN, a MAC-d protocol data unit (PDU) adopts different header formats based on the different transport channels, and thereby is formed into a MAC-d service data unit (MAC-d SDU).

In addition, a MAC-ehs PDU includes a plurality of concatenated MAC-d PDUs and is transmitted on HS-DSCH. A header of the MAC-ehs PDU consists of Logic channel identity (LCH-ID), Length (L), Transmission Sequence Number (TSN) and Flag fields. In general, the MAC-ehs PDU is applied to the UE in CELL_DCH state for the HSDPA operation and thereby each UE has a dedicated H-RNTI. Therefore, the MAC-ehs PDU can be sent to the targeting UE without including any UE identity information.

In the prior art, the UE using the common H-RNTI has to identify the received MAC packets with the headers and thereby determines to discard the packets or take a next process for dissembling the packets. On the contrary, the UE using the dedicated H-RNTI does not need the packet-identifying step. However, as can be seen from the above, the UE Id and UE Id Type fields, which carry identifiers of the targeting UE/UEs, are included neither in the MAC-d PDUs nor in the MAC-ehs PDUs. In this situation, the UE, who uses the common H-RNTI for HS-DSCH reception in CELL_FACH states has no way to identify the received MAC packets. Thus, the reception of the MAC packets in MAC-d PDUs is impossible.

In brief, the UTRAN of the prior art can use the first or second function during the RRC establishment procedure, so as to manage the UE to use the dedicated or common H-RNTI for HS-DSCH reception in CELL_FACH state. However, the UE using common H-RNTI fails in reception of MAC packets in MAC-d PDUs sent on the HS-DSCH.

SUMMARY OF THE INVENTION

The present invention therefore provides a method of improving a high-speed downlink operation in a CELL_FACH state for a network terminal and a UE of a wireless communications system and related communications device that ensures the UE performs the high-speed downlink operation according to a dedicated H-RNTI.

The present invention discloses a method of improving a high-speed downlink operation in CELL_FACH state for a network terminal of a wireless communications system. The network terminal wirelessly communicates with a UE, and the network terminal and the UE both support the high-speed downlink operation in CELL_FACH state. The method includes using a first function but not using a second function when the UE initiates a radio resource control establishment procedure. The first function is used for allocating a dedicated H-RNTI to the UE, so as to manage the UE to perform the high-speed downlink operation in CELL_FACH based on the dedicated H-RNTI. The second function is used for not allocating the dedicated H-RNTI to the UE.

The present invention further discloses a communications device of a wireless communications system for improving a high-speed downlink operation in CELL_FACH state to prevent a UE from failing in reception of downlink packets. The communications device wirelessly communicates with the UE, and the communications device and the UE both support the high-speed downlink operation in CELL_FACH state. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes using a first function but not using a second function when the UE initiates a radio resource control establishment procedure. The first function is used for allocating a dedicated H-RNTI to the UE, so as to manage the UE to perform the high-speed downlink operation in CELL_FACH based on the dedicated H-RNTI. The second function is used for not allocating the dedicated H-RNTI to the UE.

The present invention discloses a method of improving a high-speed downlink operation in CELL_FACH state for a UE of a wireless communications system. The UE wirelessly communicates with a network terminal, and the network terminal and the UE both support the high-speed downlink operation in CELL_FACH state. The method includes initiating an RRC establishment procedure; receiving an RRC CONNECTION SETUP message from the network terminal; performing the high-speed downlink operation according to a dedicated H-RNTI when the RRC CONNECTION SETUP message comprises the dedicated H-RNTI; determining the RRC CONNECTION SETUP message to be invalid when the RRC CONNECTION SETUP message does not comprise the dedicated H-RNTI.

The present invention further discloses a communications device of a wireless communications system for improving a high-speed downlink, operation in CELL_FACH state to prevent from failing in reception of downlink packets. The communications device wirelessly communicates with a network terminal, and the communications device and the network terminal both support the high-speed downlink operation in CELL_FACH state. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes initiating an RRC establishment procedure; receiving an RRC CONNECTION SETUP message from the network terminal; performing the high-speed downlink operation according to a dedicated H-RNTI when the RRC CONNECTION SETUP message comprises the dedicated H-RNTI; and determining the RRC CONNECTION SETUP message to be invalid when the RRC CONNECTION SETUP message does not comprise the dedicated H-RNTI.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
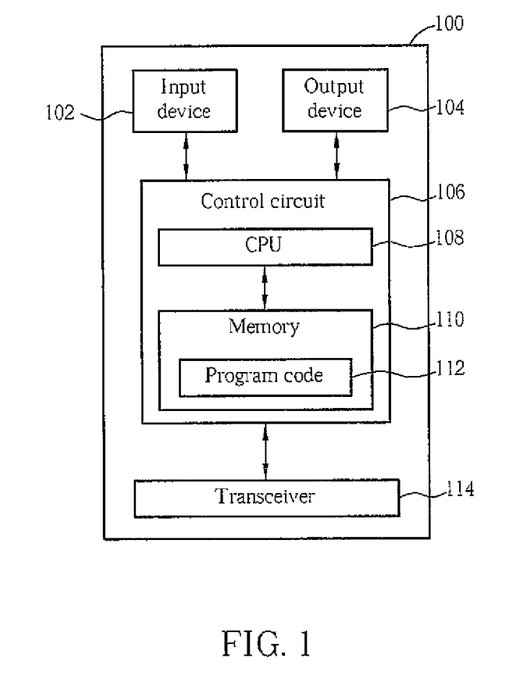
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a High Speed Package Access (HSPA) system of the third generation (3G) mobile communications system and also supports high-speed downlink operation in CELL_FACH state, which is preferably HS-DSCH reception in CELL_FACH state.

Figure 2:
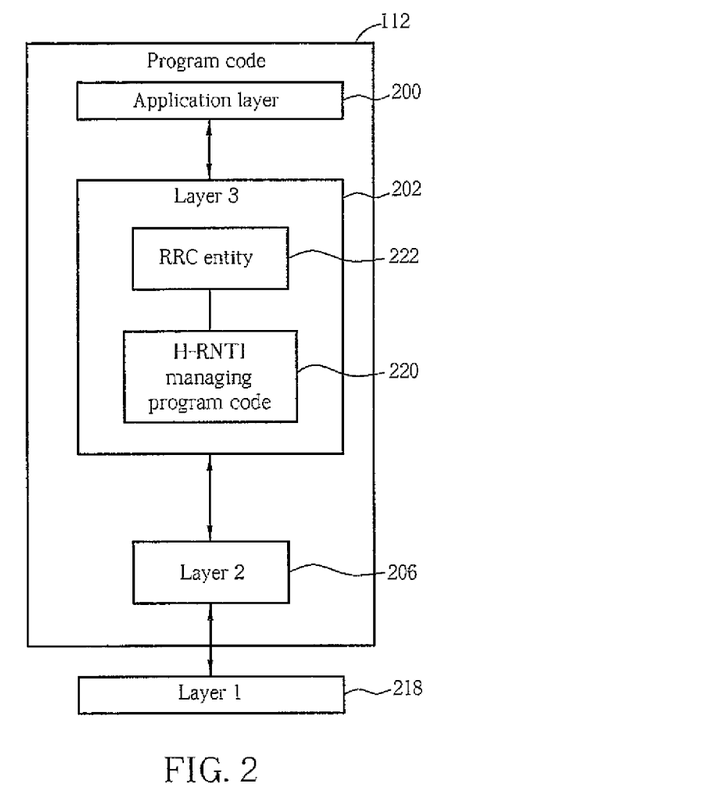
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222 for controlling the Layer 1 218 and the Layer 2 206. The Layer 2 206 includes a media access control (MAC) layer for processing MAC-ehs protocol data units (PDUs).

The communications device 100 can be a UTRAN or a UE. When the communications device 100 is applied to the UTRAN wirelessly communicating with the UE, the RRC entity 222 provides the UE with configuration corresponding to HS-DSCH reception in CELL_FACH state through an RRC establishment procedure. The MAC layer in the Layer 2 206 generates and sends MAC-ehs PDUs to the UE via HS-DSCH.

When the communications device 100 is applied to the UE, the RRC entity 222 can initiate RRC establishment procedure to receive the configuration corresponding to HS-DSCH reception in CELL_FACH state from the UTRAN. In addition, the RRC entity 222 can switch the communications device 100 among the idle mode, CELL_PCH, URA_PCH, CELL_FACH and CELL_DCH states. The communications device 100 in CELL_FACH state can activate or deactivate HS-DSCH reception in CELL_FACH state by determining an HS_DSCH_RECEPTION_CELL_FACH_STATE variable, and indicates the layer 2 206 to receive the MAC-ehs PDUs via HS-DSCH.

Figure 3:
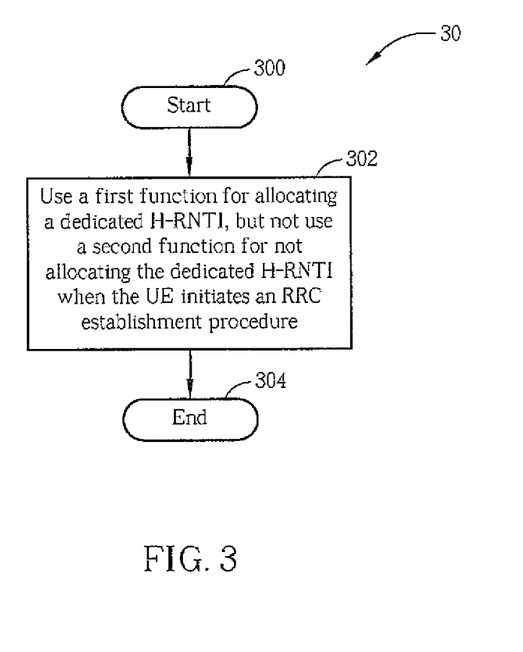
FIG. 3 is a flowchart diagram of a process for a network terminal according to an embodiment of the present invention.

In this situation, the embodiment of the present invention provides an H-RNTI managing program code 220 to manage the UE identity to prevent the UE from failing in reception of downlink data of HS-DSCH reception in CELL_FACH state. Please refer to FIG. 3, which illustrates a schematic diagram of a process 30 according to an embodiment of the present invention. The process 30 is utilized for improving a high-speed downlink operation in CELL_FACH state for a UTRAN of a wireless communications system, and can be compiled into the H-RNTI managing program code 220. The process 30 includes the following steps:

Step 300: Start.
Step 302: Use a first function for allocating a dedicated H-RNTI, but not use a second function for not allocating the dedicated H-RNTI when the UE initiates an RRC establishment procedure.
Step 304: End.

Figure 4:
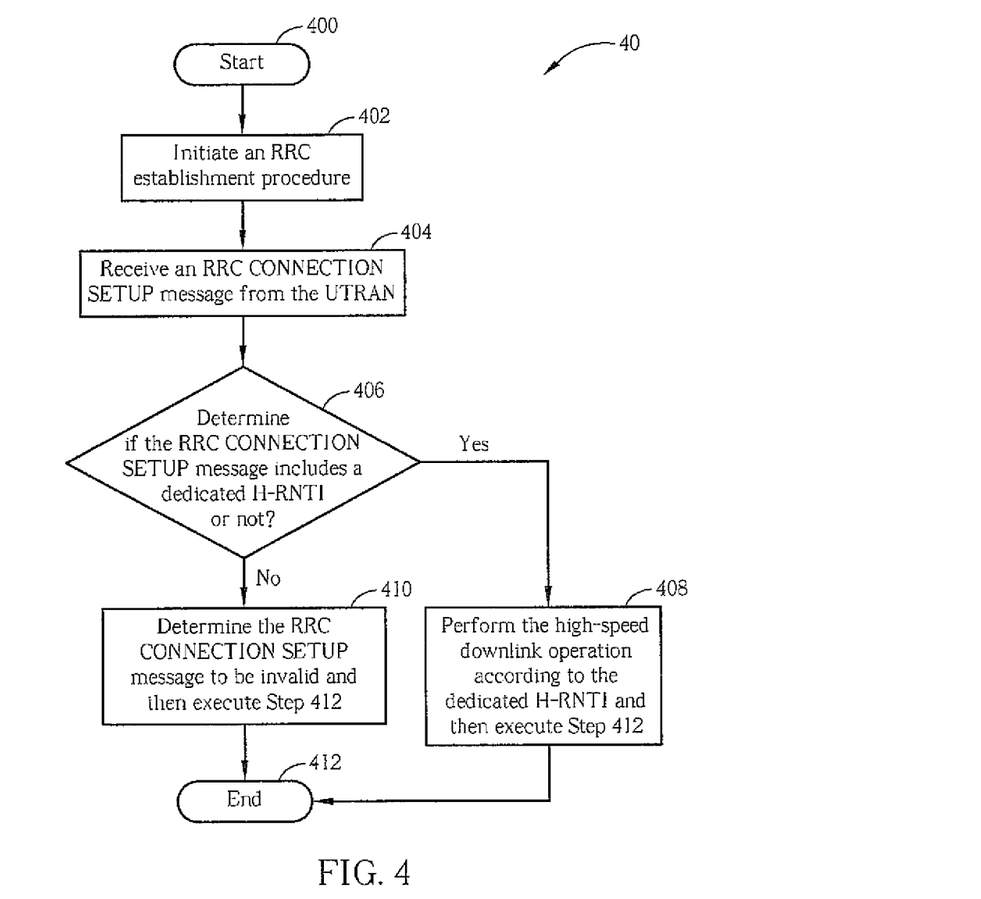
FIG. 4 is a flowchart diagram of a process for a user equipment according to an embodiment of the present invention.

In addition, please refer to FIG. 4, which illustrates a schematic diagram of a process 40 according to an embodiment of the present invention. The process 40 is applied to a UE of a wireless communications system for cooperating with the process 30 to improve the high-speed downlink operation in CELL_FACH state. The process 40 can be compiled into the H-RNTI managing program code 220 and includes the following steps:

Step 400: Start.
Step 402: Initiate an RRC establishment procedure.
Step 404: Receive an RRC CONNECTION SETUP message from the UTRAN.
Step 406: Determine if the RRC CONNECTION SETUP message includes a dedicated H-RNTI or not. If so, execute Step 408; if not, execute 410.
Step 408: Perform the high-speed downlink operation according to the dedicated H-RNTI and then execute Step 412.
Step 410: Determine the RRC CONNECTION SETUP message to be invalid and then execute Step 412.
Step 412: End.

According to the processes 30 and 40, the UE in the idle mode initiates the RRC establishment procedure to setup an RRC connection with the UTRAN and enters CELL_FACH state indicated by the UTRAN. When the RRC establishment procedure is initiated, the UTRAN always uses the first function to allocate a dedicated H-RNTI to the UE for HS-DSCH reception in CELL_FACH state. Preferably, the UTRAN firstly sets a New H-RNTI IE with the dedicated H-RNTI and includes the New H-RNTI IE in an RRC CONNECTION SETUP message, and then sends the message to the UE On the contrary, the second function for not allocating a dedicated H-RNTI to the UE is never used.

On the other hand, the UE determines if the received RRC CONNECTION SETUP message includes a dedicated H-RNTI or not. Preferably, the UE determines if the received RRC CONNECTION SETUP message includes a New H-RNTI IE or not. If so, the UE stores the dedicated H-RNTI and thereby indicates the MAC layer to receive MAC packets via HS-DSCH according to the dedicated H-RNTI. Otherwise, the UE determines the RRC CONNECTION SETUP message is invalid and notifies the UTRAN that an error occurs in the RRC establishment procedure.

Therefore, through cooperation of the processes 30 and 40, the UE always uses the dedicated H-RNTI for HS-DSCH reception in CELL_FACH state.

In conclusion, according to the prior art RRC establishment procedure, the UTRAN can use the first function, which allows the UE to use a dedicated H-RNTI for HS-DSCH reception in CELL_FACH state. Alternatively, the UTRAN can use the second function, which allows the UE using a common H-RNTI. In this situation, the UE using the common H-RNTI cannot receive the downlink MAC packets in MAC-d PDUs due to no UE Id information in the MAC packets. Compared with the prior art, the embodiment of the present invention always allocates the dedicated H-RNTI to the UE during the RRC establishment procedure, thereby ensuring that the UE can receive downlink data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of improving a high-speed downlink operation in CELL_FACH state for a network terminal of a wireless communications system, the network terminal wirelessly communicating with a user equipment, hereinafter called UE, the network terminal and the UE both supporting the high-speed downlink operation in CELL_FACH state, the method comprising:

using a first function but not using a second function when the UE initiates a radio resource control establishment procedure, wherein the first function is used for allocating a dedicated HS-DSCH radio network transaction identifier, hereinafter called H-RNTI, to the UE during a radio resource control (RRC) establishment procedure, so as to manage the UE to perform the high-speed downlink operation in CELL_FACH based on the dedicated H-RNTI, and the second function is used for not allocating the dedicated H-RNTI to the UE; and
  wherein the first function comprises:
  setting a New H-RNTI information element, hereinafter called IE, with the dedicated H-RNTI;
  including the New H-RNTI IE in an RRC CONNECTION SETUP message; and
  sending the RRC CONNECTION SETUP message to the UE.

2. The method of claim 1, wherein the second function comprises not including the New H-RNTI IE in the RRC CONNECTION SETUP message.

3. The method of claim 1, wherein the high-speed downlink operation comprises a high speed downlink shared channel, known as HS-DSCH, reception operation.

4. A communications device used in a wireless communications system for improving a high-speed downlink operation in CELL_FACH state to prevent a user equipment, hereinafter called UE, from failing in reception of downlink packets, the communications device wirelessly communicating with the UE, the communications device and the UE both supporting the high-speed downlink operation in CELL_FACH state, the communications device comprising:

a control circuit for realizing functions of the communications device;
  a central processing unit coupled to the control circuit for executing a program code to operate the control circuit; and
  a memory coupled to the central processing unit for storing the program code;
  wherein the program code comprises:
    using a first function but not using a second function when the UE initiates a radio resource control establishment procedure, wherein the first function is used for allocating a dedicated HS-DSCH radio network transaction identifier, hereinafter called H-RNTI, to the UE during a radio resource control (RRC) establishment procedure, so as to manage the UE to perform the high-speed downlink operation in CELL_FACH based on the dedicated H-RNTI, and the second function is used for not allocating the dedicated H-RNTI to the UE;
    wherein the first function comprises:
    setting a New H-RNTI information element, hereinafter called IE, with the dedicated H-RNTI;
    including the New H-RNTI IE in an RRC CONNECTION SETUP message; and
    sending the RRC CONNECTION SETUP message to the UE.

5. The communications device of claim 4, wherein the second function comprises not including the New H-RNTI IE in the RRC CONNECTION SETUP message.

6. The communications device of claim 4, wherein the high-speed downlink operation comprises a high speed downlink shared channel, known as HS-DSCH, reception operation.

7. A method of improving a high-speed downlink operation in CELL_FACH state for a user equipment, hereinafter called UE, of a wireless communications system, the UE wirelessly communicating with a network terminal, the network terminal and the UE both supporting the high-speed downlink operation in CELL_FACH state, the method comprising:

initiating a radio resource control, hereinafter called RRC, establishment procedure;
  receiving an RRC CONNECTION SETUP message from the network terminal;
  performing the high-speed downlink operation according, to a dedicated HS-DSCH radio network transaction identifier, hereinafter called H-RNTI, when the RRC CONNECTION SETUP message comprises the dedicated H-RNTI; and
  determining the RRC CONNECTION SETUP message to be invalid when the RRC CONNECTION SETUP message does not comprise the dedicated H-RNTI;
  wherein performing the high-speed downlink operation according to the dedicated H-RNTI when the RRC CONNECTION SETUP message comprises the dedicated H-RNTI is performing the high-speed downlink operation according to the dedicated H-RNTI when the RRC CONNECTION SETUP message comprises a New H-RNTI information element, hereinafter called IE, and determining the RRC CONNECTION SETUP message to be invalid when the RRC CONNECTION SETUP message does not comprise the dedicated H-RNTI is determining the RRC CONNECTION SETUP message to be invalid when the RRC CONNECTION SETUP message does not comprise the New H-RNTI IE, where the New H-RNTI IE is used for carrying settings corresponding to the dedicated H-RNTI.

8. The method of claim 7 further comprising notifying the network terminal that an error occurs in the RRC establishment procedure when the RRC CONNECTION SETUP message is determined to be invalid.

9. The method of claim 7, wherein the high-speed downlink operation comprises a high speed downlink shared channel, known as HS-DSCH, reception operation.

10. A communications device used in a wireless communications system for improving a high-speed downlink operation in CELLFACH state to prevent from failing in reception of downlink packets, the communications device wirelessly communicating with a network terminal, the communications device and the network terminal both supporting the high-speed downlink operation in CELL_FACH state, the communications device comprising:

a control circuit for realizing functions of the communications device;
  a central processing unit coupled to the control circuit for executing a program code to operate the control circuit; and
  a memory coupled to the central processing unit for storing the program code;
  wherein the program code comprises:
    initiating a radio resource control, hereinafter called RRC, establishment procedure;
    receiving an RRC CONNECTION SETUP message from the network terminal;
    performing the high-speed downlink operation according to a dedicated HS-DSCH radio network transaction identifier, hereinafter called H-RNTI, when the RRC CONNECTION SETUP message comprises the dedicated H-RNTI; and determining the RRC CONNECTION SETUP message to be invalid when the RRC CONNECTION SETUP message does not comprise the dedicated H-RNTI;

wherein performing the high-speed downlink operation according to the dedicated H-RNTI when the RRC CONNECTION SETUP message comprises the dedicated H-RNTI is performing the high-speed downlink operation according to the dedicated H-RNTI when the RRC CONNECTION SETUP message comprises a New H-RNTI information element, hereinafter called IE, and determining the RRC CONNECTION SETUP message to be invalid when the RRC CONNECTION SETUP message does not comprise the dedicated H-RNTI is determining the RRC CONNECTION SETUP message to be invalid when the RRC CONNECTION SETUP message does not comprise the New H-RNTI IE, where the New H-RNTI IE is used for carrying settings corresponding to the dedicated H-RNTI.

11. The communications device of claim 10, wherein the program code further comprises notifying the network terminal that an error occurs in the RRC establishment procedure when the RRC CONNECTION SETUP message is determined to be invalid.

12. The communications device of claim 10, wherein the high-speed downlink operation comprises a high speed downlink shared channel, known as HS-DSCH, reception operation.

* * * * *